United States Patent
Newstadt et al.

(10) Patent No.: US 8,752,170 B1
(45) Date of Patent: Jun. 10, 2014

(54) VERIFICATION AND VALIDATION OF EXTERNALLY MAINTAINED PROFILE ATTRIBUTES

(75) Inventors: Keith Newstadt, Newton, MA (US); Timothy G. Brown, Fort Edward, NY (US)

(73) Assignee: Symantec Corporation, Mountain View, CA (US)

( * ) Notice: Subject to any disclaimer, the term of this patent is extended or adjusted under 35 U.S.C. 154(b) by 1101 days.

(21) Appl. No.: 12/195,375

(22) Filed: Aug. 20, 2008

(51) Int. Cl.
| | |
|---|---|
| G06F 12/14 | (2006.01) |
| G06F 7/04 | (2006.01) |
| H04L 29/06 | (2006.01) |
| H04L 9/32 | (2006.01) |
| G06F 11/30 | (2006.01) |
| G06F 21/00 | (2013.01) |
| G06F 15/16 | (2006.01) |

(52) U.S. Cl.
USPC .............. 726/22; 726/4; 713/165; 713/168; 713/182; 713/187; 709/204; 709/205

(58) Field of Classification Search
USPC .......... 726/26, 4, 22; 713/165, 168, 182, 187; 709/204, 205
See application file for complete search history.

(56) References Cited

U.S. PATENT DOCUMENTS

| | | | |
|---|---|---|---|
| 2005/0216582 A1* | 9/2005 | Toomey et al. | 709/224 |
| 2006/0168643 A1* | 7/2006 | Howard et al. | 726/2 |
| 2008/0077877 A1* | 3/2008 | Tom et al. | 715/772 |
| 2008/0177834 A1* | 7/2008 | Gruhl et al. | 709/204 |
| 2009/0292814 A1* | 11/2009 | Ting et al. | 709/229 |
| 2009/0327432 A1* | 12/2009 | Augustine et al. | 709/206 |

* cited by examiner

*Primary Examiner* — Aravind Moorthy

(74) *Attorney, Agent, or Firm* — Brill Law Office; Jeffrey Brill

(57) ABSTRACT

Independent verification of user profile attributes that are stored on third-party community-based web sites is provided. A user request indicates target profile attributes to verify. Profile attribute data concerning a profile owner is collected from a plurality of community sites. The collected data is verified, and results of the verification process are stored in a database. When a user views verified profile attributes on a page on a community site, the corresponding stored verification status is retrieved, and an indication of the trust status of the profile is output to the user, for example by modifying the displayed web page to display the trust status.

20 Claims, 2 Drawing Sheets

VERIFICATION AND VALIDATION OF EXTERNALLY MAINTAINED PROFILE ATTRIBUTES

TECHNICAL FIELD

This invention pertains generally to online communities, and more specifically to independently verifying and validating externally maintained profile attributes.

BACKGROUND

Many Internet users participate in online communities. Online community members maintain profiles, in which they post information about themselves. Community members share information and interact with one another based on such profile information. For example, a user might add a new friend to his FaceBook community based on the fact that the friend's profile indicates that he went to the same high school. Another user might add a new contact to her LinkedIn community because of a profile indication that the two worked at the same company some years ago. However, the users adding members to their communities do not know that those parties actually went to the indicated high school or worked at the particular company; their profiles just claim that they did. Third-party community-based sites generally offer no validation of the profile data of their users. Even if they did, such validation would only be at an individual site level. In any case, a community web site is not a disinterested party, and like all self policing, validation of their own users would raise trust issues.

As time goes on, users are sharing more and more personal information via online communities. Profiles often include such personal data as identifying information that could be used for identity theft, pictures of children, thoughts and opinions, love interests, current activities, etc. As more information is distributed online, this information will become even more personal and private: current geographic location, financial data, medical history, etc. Heretofore, there has been no trustworthy mechanism to validate profile information across community sites. It would be desirable to address this shortcoming.

SUMMARY

Member profile information is consistently validated across multiple community-based web sites by a trusted third party. More specifically, a user request indicates target profile attributes to verify. Profile attribute data concerning a profile owner is collected from a plurality of community sites. The collected data is verified, and results of the verification process are stored in a database. When a user views verified profile attributes on a page on a community site, the corresponding stored verification status is retrieved, and an indication of the trust status of the profile is output to the user, for example by modifying the displayed web page to display the trust status.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
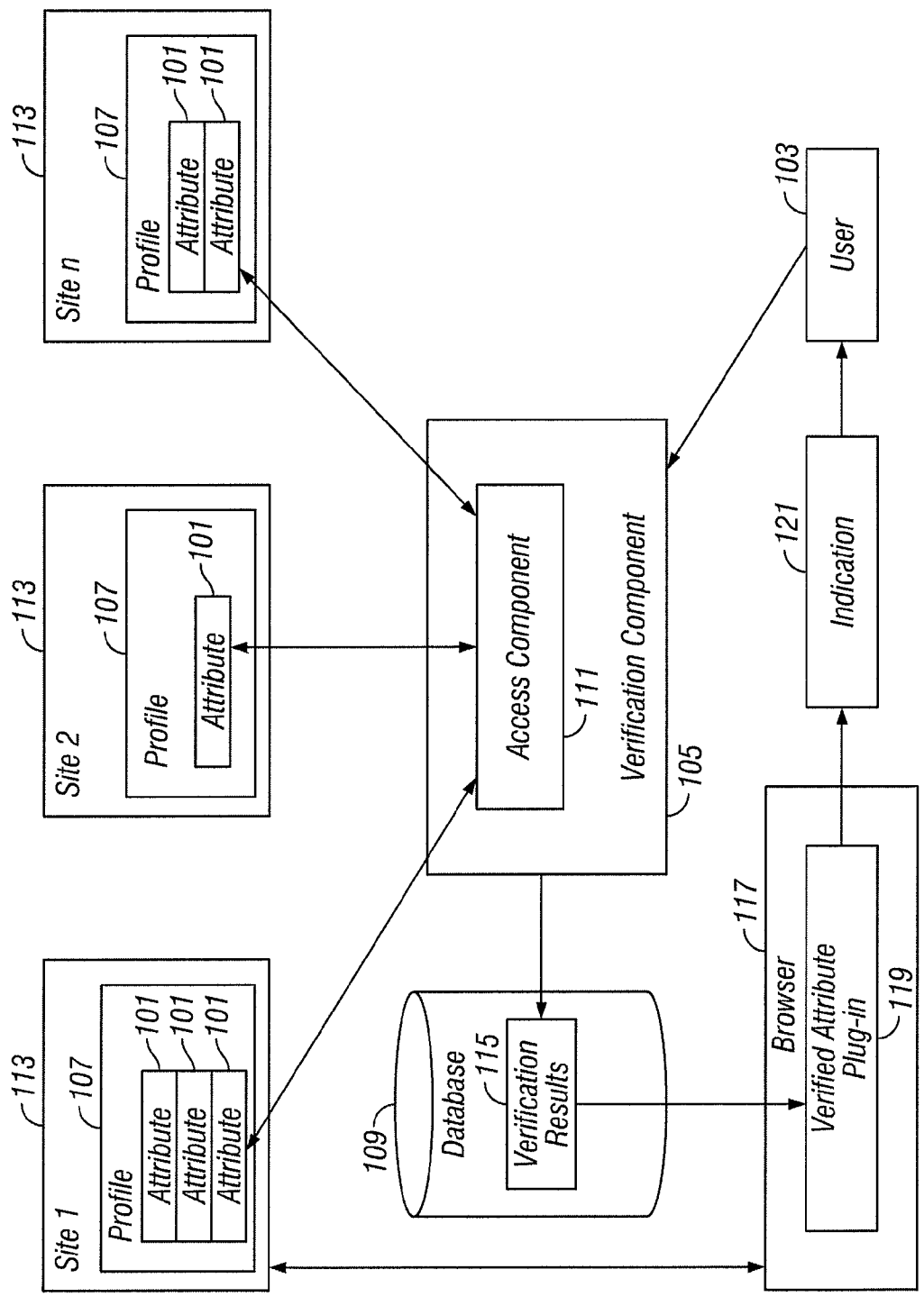
FIG. 1 is a block diagram illustrating independently verifying and validating externally maintained profile attributes, according to some embodiments of the present invention.

FIG. 1 illustrates a system for independently verifying and validating externally maintained profile attributes 101, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a user 103 can request verification of one or more profile attributes 101 of another party 103. A user 103 can also request that his/her own profile attributes 101 be subject to the verification process, so that his/her profile is trusted by others. Such requests can be made through any type of standard user interface functionality.

Responsive to a user 103 request, an attribute verification component 105 verifies attributes 101 of a target profile 107. In some embodiments, the attribute verification component 105 can automatically perform such verification under other circumstances, e.g., a user 103 requesting to be added as a friend, a user 103 adding/indicating a specific type of information 101 to/in a profile 107, etc. The attribute verification component 105 applies existing data verification mechanisms to the profile information 101 to be verified.

Multiple levels of verification can be performed, as desired. Some levels of verification can be executed without interaction with the profile owner 103. For example, without interacting with the profile owner 103 the attribute verification component 105 can determine whether the profile information is consistent across multiple sites 113, and whether the specific content matches public records and other verification sources (e.g., is there someone on public record with the indicated name, who lives at the indicated address, works at the indicated company, went to the indicated high school, etc.).

An additional level of validation involves interacting with the profile owner 103, to determine that the owner 103 is in fact the person indicated by the profile 107. Where this level of verification is desired, the attribute verification component 105 can invite the profile owner 103 to go through the validation process on behalf of the requesting user 103. What the owner 103 would gain in return for completing the validation process is the requester's trust.

It is to be understood that a variety of data verification methodologies are known to those of ordinary skill in the relevant art, and the use thereof within the context of the present invention will be readily apparent to those of such a skill level in light of this specification. It is to be further understood that any of a variety of verification methodologies can be applied in any desired combination (e.g., internal consistency across sites 113, public records, trusted verifier(s), query of target party 103, etc.). The verification process can indicate that a profile attribute 101 is or is not trusted, or is trusted to a quantifiable degree (e.g., 80% likely to be legitimate, etc.).

In order to glean the profile attributes 101 to verify, an attribute access component 111 (illustrated in FIG. 1 as a sub-component of the verification component 105) accesses the various community-based online sites 113 of which the user 103 undergoing the verification process is a member. The attribute access component 111 collects the relevant attributes 101 from each site 113 for verification by the verification component 105. The access component 111 typically comprises a set of plug-ins (not illustrated), each of which is responsible for implementing data source specific functionality for a given site 113, such as login, screen scraping, email/IM database access, etc. This site 113 specific functionality can be mapped to a simple known interface/API, thus normalizing access component 111 actions across multiple sites 113. In other words, each plug-in is specifically configured to collect relevant profile information 101 in the native format of its target site 113 by using site specific appropriate protocols. The plug-ins transparently provide this information 101 for verification purposes. This component thus provides an abstraction through which the verification component 105 can receive data from any number of third party web sites 113. In one embodiment, the functionality of these plug-ins is built directly into the access component 111, although the plug-in model provides a more flexible and extensible framework.

By verifying the profile information 101 collected from the multiple sites 113, the attribute verification component 105 tracks the results of its validation activity independently of the various online communities 113 of which users 103 are members. The attribute verification component 105 stores the results 115 of the verifications in a verified attribute database 109 (or another form of suitable storage mechanism). Stored verification data 115 typically include such information as the online community where the attribute 101 is stored, the attribute name, the attribute value, and the level of verification that was successfully applied to it. Note that although it is possible to store the actual profile content 101, this is not necessary. Typically, only an indication of the content 101 (e.g., a hash) is stored as part of the verification status information 115. The database 109 allows the tracking of verification levels across multiple third-party web sites 113, without cooperation or help from those sites 113.

When a user 103 views relevant pages on community-based sites 113 with a browser 117, a verified attribute browser plug-in 119 parses the pages, and determines the verification status of viewed profile attributes 101. These online community sites 113 can be, e.g., social networking sites such as LinkedIn and FaceBook, online contact databases such as Plaxo, employee directories, etc. The verified attribute browser plug-in 119 identifies profile attributes 101, and queries the verified attribute database 109 to determine the verification status 115 thereof. The verified attribute plug-in 119 then modifies the displayed web page image to include a graphical (or other, e.g., audio) indication 121 of those attributes 101 that the database 109 indicates are verified (and/or not verified). This indication 121 can also present a numerical or other indication of a verification quantification (e.g., 99% trusted, 50% trusted, not trusted, etc.). It is to be understood that this component 119 can be implemented in ways other than a browser plug-in where desired (e.g., a local or remote proxy). Additionally, where the community sites 113 are viewed through an interface other than a browser 117, this component 119 is configured accordingly to work therewith. In some embodiments, components other than a verified attribute browser plug-in 119 can query the database 109 for attribute verification information as desired.

Figure 2:
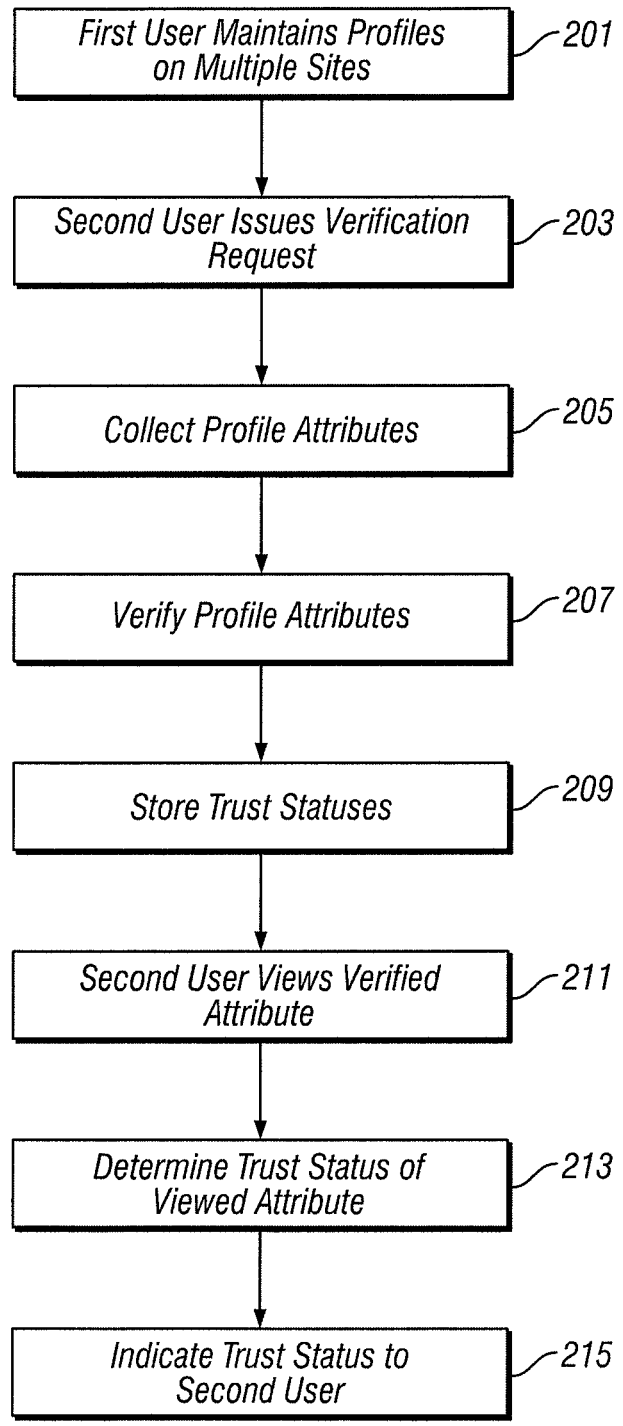
FIG. 2 is a flowchart illustrating steps for independently verifying and validating externally maintained profile attributes, according to some embodiments of the present invention.

FIG. 2 illustrates steps for an example instance of verifying and validating externally maintained profile attributes 101, according to some embodiments of the present invention. In the example of FIG. 2, suppose a first user 103 maintains 201 accounts on multiple sites 113, FaceBook, Plaxo and LinkedIn, all of which indicate that his name is John Smith. According to his FaceBook profile, he graduated from Weston High School. His Plaxo profile says that he lives at 18 Myrtle Street. His LinkedIn profile indicates that he is a manager at Acme Company. A second user 103 thinks he knows John Smith, and wants to add him as a FaceBook friend, which would involve sharing personal information. In deciding whether or not to take such a step, the second user 103 wants to know that the posted information 101 concerning John Smith is truthful and accurate. Therefore, the second user 103 issues 203 a request to verify this profile information 101.

Responsive to the request, the access component 111 collects 205 the relevant profile information 101 from the multiple sites 113 on which these attributes 101 reside. The attribute verification component 105 proceeds to verify 207 the profile attributes 101, and store 209 the validation results 115 (e.g., attribute name, profile, value, site 113, level of validation that it has passed, etc.) in the database 109. When the second user 103 views 211 John Smith's profiles on FaceBook, LinkedIn and Plaxo, the verified attribute plug-in 119 queries the database 109 and determines 213 the level of verification of the profile attributes 101 being displayed. The plug-in then adds 215 an indication of these trust levels to the displayed pages, which allows the second user 103 to intelligently determine whether or not to trust the profile data 101.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for verifying externally maintained profile attributes, the method comprising the steps of:
    collecting, by a computer, data concerning at least one profile attribute to be verified from a plurality of sites, the at least one profile attribute comprising content posted on a social networking web site that is associated with a profile owner;
    verifying, by a computer, the collected profile attribute data to a user other than the profile owner;
    storing, by a computer, verification status information concerning profile attribute data, independently of the plurality of sites; and
    utilizing, by a computer, stored verification status information to output at least one indication to the user other than the profile owner concerning verification status of at least one profile attribute.

2. The method of claim 1 further comprising performing at least one step from a group of steps consisting of:
    verifying the collected profile attribute data responsive to a request from the profile owner; and
    verifying the collected profile attribute data responsive to a request from the user other than the profile owner.

3. The method of claim 1 wherein verifying collected profile attribute data further comprises performing at least one step from a group of steps consisting of:
    checking profile attribute data for consistency across a plurality of sites;
    comparing profile attribute data to public domain records;
    verifying profile attribute data through a trusted third party; and
    communicating with a profile owner to verify profile attribute data.

4. The method of claim 1 wherein verifying collected profile attribute data further comprises determining that profile attribute data is of a trust status from a group of trust statuses consisting of:
    trusted;
    not trusted; and
    partially trusted to a specific, quantifiable degree.

5. The method of claim 1 wherein storing verification status information concerning profile attribute data further comprises:
    storing at least an indication of content of at least one profile attribute and a corresponding trust status.

6. The method of claim 1 further comprising:
    verifying at least one profile attribute responsive to receiving a user generated request.

7. The method of claim 1 wherein utilizing, by a computer, stored verification status information to output at least one indication to the user other than the profile owner concerning verification status of at least one profile attribute further comprises:
    responsive to a user attempting to view a profile attribute concerning which stored verification status information is available, outputting an indication to the user based on the stored verification status information concerning the profile attribute.

8. The method of claim 7 further comprising:
    determining that a user is attempting to view a profile attribute;
    determining that stored verification status information concerning the profile attribute is available;
    retrieving the stored verification status information concerning the profile attribute; and
    outputting the indication to the user based on the stored verification status information concerning the profile attribute.

9. The method of claim 7 wherein outputting an indication to the user further comprises outputting one from a group consisting of:
    an indication that the profile attribute is trusted;
    an indication that the profile attribute is not trusted; and
    an indication that the profile attribute is partially trusted to a specific, quantifiable degree.

10. The method of claim 7 wherein outputting an indication to the user further comprises:
    modifying an image of a web page as displayed to the user by a browser so as to display the indication.

11. At least one non-transitory computer readable medium containing a computer program product for verifying externally maintained profile attributes, the computer program product comprising:
    program code for collecting data concerning at least one profile attribute to be verified a plurality of sites, the at least one profile attribute comprising content posted on a social networking web site that is associated with a profile owner;
    program code for verifying the collected profile attribute data to a user other than the profile owner;
    program code for storing verification status information concerning profile attribute data, independently of the plurality of sites; and
    program code for utilizing stored verification status information to output at least one indication to the user other than the profile owner concerning verification status of at least one profile attribute.

12. The computer program product of claim 11 further comprising program code for performing at least one step from a group of steps consisting of:
    verifying the collected profile attribute data responsive to a request from the profile owner; and
    verifying the collected profile attribute data responsive to a request from the user other than the profile owner.

13. The computer program product of claim 11 wherein the program code for verifying collected profile attribute data further comprises program code for performing at least one step from a group of steps consisting of:
    checking profile attribute data for consistency across a plurality of sites;
    comparing profile attribute data to public domain records;
    verifying profile attribute data through a trusted third party; and
    communicating with a profile owner to verify profile attribute data.

14. The computer program product of claim 11 wherein the program code for verifying collected profile attribute data further comprises program code for determining that profile attribute data is of a trust status from a group of trust statuses consisting of:

trusted;

not trusted; and partially trusted to a specific, quantifiable degree.

15. The computer program product of claim 11 wherein the program code for storing verification status information concerning profile attribute data further comprises:

program code for storing at least an indication of content of at least one profile attribute and a corresponding trust status.

16. The computer program product of claim 11 further comprising:

program code for verifying at least one profile attribute responsive to receiving a user generated request.

17. The computer program product of claim 11 wherein the program code for utilizing stored verification status information to output at least one indication to the user other than the profile owner concerning verification status of at least one profile attribute further comprises:

program code for, responsive to a user attempting to view a profile attribute concerning which stored verification status information is available, outputting an indication to the user based on the stored verification status information concerning the profile attribute.

18. The computer program product of claim 17 further comprising:

program code for determining that a user is attempting to view a profile attribute;

program code for determining that stored verification status information concerning the profile attribute is available;

program code for retrieving the stored verification status information concerning the profile attribute; and program code for outputting the indication to the user based on the stored verification status information concerning the profile attribute.

19. The computer program product of claim 17 wherein the program code for outputting an indication to the user further comprises program code for outputting one from a group consisting of:

an indication that the profile attribute is trusted;

an indication that the profile attribute is not trusted; and an indication that the profile attribute is partially trusted to a specific, quantifiable degree.

20. A computer system for verifying externally maintained profile attributes, the computer system comprising:

a hardware component configured for collecting data concerning at least one profile attribute to be verified from a plurality of sites, the at least one profile attribute comprising content posted on a social networking web site that is associated with a profile owner;

a hardware component configured for verifying the collected profile attribute data to a user other than the profile owner;

a hardware component configured for storing verification status information concerning profile attribute data, independently of the plurality of sites; and a hardware component configured for utilizing stored verification status information to output at least one indication to the user other than the profile owner concerning verification status of at least one profile attribute.

\* \* \* \* \*